Patented Aug. 13, 1946

2,405,713

UNITED STATES PATENT OFFICE 2,405,713

PRODUCTION OF ALCOHOLATES

William F. Russell, Norwalk, Conn., assignor to R. T. Vanderbilt Company, Incorporated, New York, N. Y., a corporation of New York No Drawing. Application August 19, 1943, Serial No. 499,255

3 Claims. (Cl. 252—42.7)

This invention relates to improvements in the production of alcoholates of the alkaline-earth metals. This application is a continuation in part of my application filed June 26, 1943, Serial No. 492,470.

Calcium salts of certain complex alcohols have proven valuable addends in the compounding of lubricating oils. The production of such calcium alcoholates, particularly of the purity required for such purposes, however, has proven virtually impossible in the practical sense. Either the methods have been inordinately expensive, or the yields have been prohibitively low, or the product has been obtained only in association with impurities of quality and in quantity impairing its utility, for example, by rendering it less soluble in lubricating oil stocks than required for such purposes.

As stated in my application Serial No. 492,470, I have discovered that the hydroxides and oxides of barium, unlike those of calcium, react directly with certain aliphatic alcohol groups in high-boiling hydrocarbon media to produce the corresponding alcoholate in high yield, of high purity and thus that the barium salts can be produced, efficiently and economically, in a simple and direct operation. As lubricating oil addends, such of these salts as are oil-soluble compare favorably with the calcium salts. They are distinguished from the calcium salts, however, in that my invention makes them available in the practical sense.

According to my present invention, I dehydrate and react hydrous barium hydroxide directly with a high-boiling primary alcohol in a high-boiling hydrocarbon medium in the presence of a low-boiling inert solvent higher-boiling than water, separate insoluble material from the solution of the reaction product in the high-boiling hydrocarbon medium in the presence of the low-boiling solvent and then strip the low-boiling solvent from the hydrocarbon solution of the alcoholate. The dehydration, the reaction and the separation of insolubles, by filtration for example, are all carried out in the presence of the low-boiling inert solvent. Petroleum naphthas and xylene, for example, are useful as such solvents.

In carrying out my present invention, I charge the high-boiling hydrocarbon oil, or the bulk of it, the hydrous barium hydroxide and the low-boiling inert solvent into a closed distillation vessel equipped with a reflux condenser and a trap for separating water from the reflux condensate. I gradually heat this charge, with total reflux of the low-boiling solvent, to a temperature of 105°–120° C. Gradual heating of the charge up to the point at which the water of hydration of the barium hydroxide is substantially eliminated is important if excessive frothing is to be avoided. I then add the high-boiling primary alcohol, and I may then add any remaining part of the high-boiling hydrocarbon oil, and heat the composite charge, with total reflux of the low-boiling solvent, to the reaction temperature, 200°–220° C. for example, and maintain that temperature until the reaction is substantially complete. Water of hydration and water of reaction are separated from the composite reflux condensate and the solvent component of the reflux condensate is returned to the charge in the distillation vessel throughout the dehydration and the reaction. I then cool the charge and, for example, filter it with a filter-aid and then strip the solvent from the high-boiling oil solution of the alcoholate by vacuum distillation. Additional low-boiling solvent may be added to facilitate the filtration. Part of the high-boiling hydrocarbon oil may also be added before or after the filtration or after the stripping. Such supplemental additions of part of the high-boiling hydrocarbon oil are a convenient means for controlling the barium oxide equivalent content of the charge and of the product. Low-boiling solvents boiling between about 85° C. and 150° C. are advantageous. The high-boiling hydrocarbon oil is with advantage a high-boiling petroleum stock, a lubricating oil fraction for example. I thus produce concentrated solutions of oil-soluble alcoholates directly available as a compounding material for incorporating the alcoholate into lubricating oils in the desired proportion.

In this manner, I secure from appropriate alcohols high yields of barium alcoholates of high purity characterized particularly by complete solubility in petroleum lubricating oil stocks.

The method of my invention requires the use of primary alcohols, that is of alcohols comprising an aliphatic primary alcohol group. Secondary alcohols, such as heptadecanol and amylcyclohexanol, do not react in the process. The method of my invention also requires the use of alcohols boiling above the reaction temperature if fractional condensation of the alcohol before refluxing of the low-boiling solvent component of the vapor composite liberated in the distillation vessel is to be avoided, that is of alcohols boiling above about 200° C. With such fractional condensation of the alcohol component of the vapor composite, the method of my present invention is useful with alcohols higher boiling than the low-boiling solvent, for example, alcohols boiling above about 150° C. for example. However, the oil-soluble alcoholates are to be found among the salts of such high-boiling alcohols. The barium salts of diamylphenoxyethanol and of diamylphenoxyethoxyethanol for example are completely soluble in oil. The barium salt of methylisopropylphenoxyethanol is also soluble in oil although less soluble than the alcoholates just mentioned.

The following example illustrates an advantageous embodiment of the method of my present invention. It will be noted that the alcohol, comprising an aliphatic primary alcohol group, is reacted directly with the barium hydroxide as such.

205 pounds of a petroleum lubricating oil, 127 pounds of Ba(OH)$_2$.8H$_2$O and 5 gallons of xylene were charged into a cast iron distillation vessel equipped with a reflux condenser provided with a trap to separate water from the reflux condensate returned to the distillation vessel and with a mechanical stirrer. With the stirrer in operation, the charge was heated from about 34° C. to about 117° C. over a period of about 3¾ hours while maintaining total reflux of the xylene. In that period about 6.2 gallons of water were trapped out of the reflux condensate. The water of hydration of the barium hydroxide charged to the distillation vessel originally amounted to about 6.1 gallons and the total water equivalent to about 8.7 gallons. 222 pounds of diamylphenoxyethanol and 35 additional pounds of the lubricating oil were then added to the charge and the charge was heated to about 200° C. over a period of about 1¾ hours. The charge was then maintained at a temperature of 200°–210° C. for about 3½ hours. The charge was then permitted to cool to about 85° C. Throughout the operation to this point, total reflux of the xylene was maintained. About 2.9 gallons of water were trapped out of the reflux condensate after the addition of the diamylphenoxyethanol. The cooled charge was diluted with about ⅓ of its volume of petroleum naphtha, a filter-aid was added and the composite was filtered. The filtrate was stripped of naphtha and xylene by distillation under a high vacuum. The stripped filtrate, the product of the method of my present invention, was a clear brown, viscous liquid.

The method of my invention is particularly useful for the production of oil-soluble alcoholates. However, it is also useful in the production of oil-insoluble alcoholates of high boiling alcohols comprising an aliphatic primary alcohol group. For example, oil-insoluble alcoholates are produced with dimethylphenoxyethanol, methylphenoxyethanol, octyl alcohol, benzyl alcohol and cetyl alcohol by washing the oil out of the precipitated reaction product, for example with naphtha or benzene, instead of separating insolubles from the oil solution of the reaction product.

The method of my invention is generally applicable to alcohols, simple and complex, comprising an aliphatic primary alcohol group available for reaction as such and it is in this sense that I refer to alcohols comprising an aliphatic primary alcohol group. The ethanol substituent group in the diamylphenoxyethanol of the foregoing example is such an aliphatic primary alcohol group.

I claim:

1. In the production of petroleum oil concentrates of oil-soluble barium alcoholates, the steps which comprise adding hydrous barium hydroxide and an inert hydrocarbon solvent to a high-boiling petroleum stock, the inert solvent boiling above the boiling point of water, dehydrating the barium hydroxide by heating the mixture to a temperature of 105° to 120° C. while refluxing the solvent, adding an alcohol comprising an aliphatic primary alcohol group to said mixture, reacting the barium hydroxide directly with the alcohol and separating the water of reaction by heating the mixture to a temperature of 200° to 220° C., the alcohol boiling above about 200° C., cooling the water-free mixture, and filtering insoluble material therefrom.

2. The method of producing a concentrated solution of a barium alcoholate in a lubricating oil, which comprises adding hydrous barium hydroxide and an inert hydrocarbon solvent having a boiling point between 85° and 150° C. to a lubricating oil stock, dehydrating the barium hydroxide by heating the mixture to a temperature of 105° to 120° C. while totally refluxing the solvent, adding a high-boiling alcohol comprising an aliphatic primary alcohol group to the mixture, reacting the barium hydroxide directly with the alcohol and separating the water of reaction by heating the mixture to a temperature of 200° to 220° C. while totally refluxing the solvent, the alcohol boiling above about 200° C., cooling the water-free mixture, filtering insoluble material therefrom, and separating the hydrocarbon solvent therefrom by distillation.

3. The method as claimed in claim 2, wherein the barium hydroxide is reacted directly with diamylphenoxyethanol.

WILLIAM F. RUSSELL.